(12) United States Patent
Zhao et al.

(10) Patent No.: US 12,641,310 B2
(45) Date of Patent: May 26, 2026

(54) METHOD FOR SEARCHING FOR CHANNELS AND DISPLAY APPARATUS

(71) Applicant: HISENSE ELECTRONICS TECHNOLOGY (SHENZHEN) CO., LTD, Guangdong (CN)

(72) Inventors: Zhongmin Zhao, Guangdong (CN); Jian Liu, Guangdong (CN); Weijia Yan, Guangdong (CN)

(73) Assignee: HISENSE ELECTRONICS TECHNOLOGY (SHENZHEN) CO., LTD, Shenzhen (CN)

( * ) Notice: Subject to any disclaimer, the term of this patent is extended or adjusted under 35 U.S.C. 154(b) by 63 days.

(21) Appl. No.: 18/437,470

(22) Filed: Feb. 9, 2024

(65) Prior Publication Data

US 2024/0187682 A1 Jun. 6, 2024

Related U.S. Application Data

(63) Continuation of application No. PCT/CN2022/111526, filed on Aug. 10, 2022.

(30) Foreign Application Priority Data

Aug. 10, 2021 (CN) .......................... 202110912143.X
Aug. 13, 2021 (CN) .......................... 202110932457.6

(51) Int. Cl.
*H04N 21/438* (2011.01)
*H04N 21/472* (2011.01)
*H04N 21/482* (2011.01)

(52) U.S. Cl.
CPC ....... *H04N 21/4383* (2013.01); *H04N 21/472* (2013.01); *H04N 21/482* (2013.01)

(58) Field of Classification Search
CPC ............. H04N 21/4345; H04N 21/438; H04N 21/4383; H04N 21/462; H04N 21/472; H04N 21/482
See application file for complete search history.

(56) References Cited

U.S. PATENT DOCUMENTS

2002/0045430 A1 4/2002 Kamei
2009/0106799 A1 4/2009 Park et al.
(Continued)

FOREIGN PATENT DOCUMENTS

CN 101420551 A 4/2009
CN 102186040 A * 9/2011
(Continued)

OTHER PUBLICATIONS

International Search Report, mailed Oct. 10, 2022, from PCT/CN2022/1115264, 4 pages.
(Continued)

*Primary Examiner* — Rong Le
(74) *Attorney, Agent, or Firm* — Workman Nydegger

(57) ABSTRACT

Disclosed in the present application are a method for channel searching and a display apparatus. The method can include: in response to a channel search instruction, obtaining a frequency of a channel to be searched in a first list of frequencies, and performing channel search to obtain a first-type broadcast channel; skipping one or more frequencies corresponding to the first-type broadcast channel, and performing channel search based on remaining frequencies in the first list of frequencies to obtain a second-type broadcast channel.

12 Claims, 10 Drawing Sheets

In response to a channel search instruction, obtaining a first broadcast version and a second broadcast version for providing channels, and a first list of frequencies for presenting channels — S1

Performing channel search based on each frequency in the first list and the first broadcast version to obtain the first-type broadcast channel, and adding an identifier to a frequency corresponding to the first-type broadcast channel — S2

After the channel search for the first broadcast version is completed, deleting the frequency with the identifier in the first list, and performing channel search based on each frequency in a second list derived from the first list by deleting the frequency with the identifier and the second broadcast version to obtain the second-type broadcast channel — S3

(56)  References Cited

U.S. PATENT DOCUMENTS

| | | | |
|---|---|---|---|
| 2010/0118196 | A1 | 5/2010 | Lee |
| 2011/0289530 | A1 | 11/2011 | Dureau et al. |
| 2015/0103255 | A1* | 4/2015 | Kim ..................... H04N 21/426 |
| | | | 348/732 |
| 2023/0044827 | A1* | 2/2023 | Jang ......................... H04N 7/01 |

FOREIGN PATENT DOCUMENTS

| | | | | |
|---|---|---|---|---|
| CN | 103248942 | A | | 8/2013 |
| CN | 105245947 | A | | 1/2016 |
| CN | 106658165 | A | | 5/2017 |
| CN | 106792137 | A | | 5/2017 |
| CN | 107682738 | A | * | 2/2018 |
| CN | 110073650 | A | | 7/2019 |
| CN | 113490042 | A | | 10/2021 |
| CN | 113573149 | A | | 10/2021 |
| EP | 1926309 | A1 | | 5/2008 |
| EP | 3506174 | A1 | | 7/2019 |
| JP | 2004165861 | A | | 6/2004 |

OTHER PUBLICATIONS

Chinese First Office Action, mailed Sep. 2, 2022, from Chinese App.
No. 202110932457.6, 16 pages.
Chinese Second Office Action, mailed Mar. 4, 2023, from Chinese
App. No. 202110932457.6, 15 pages.

\* cited by examiner

400

200

Internet

100

300

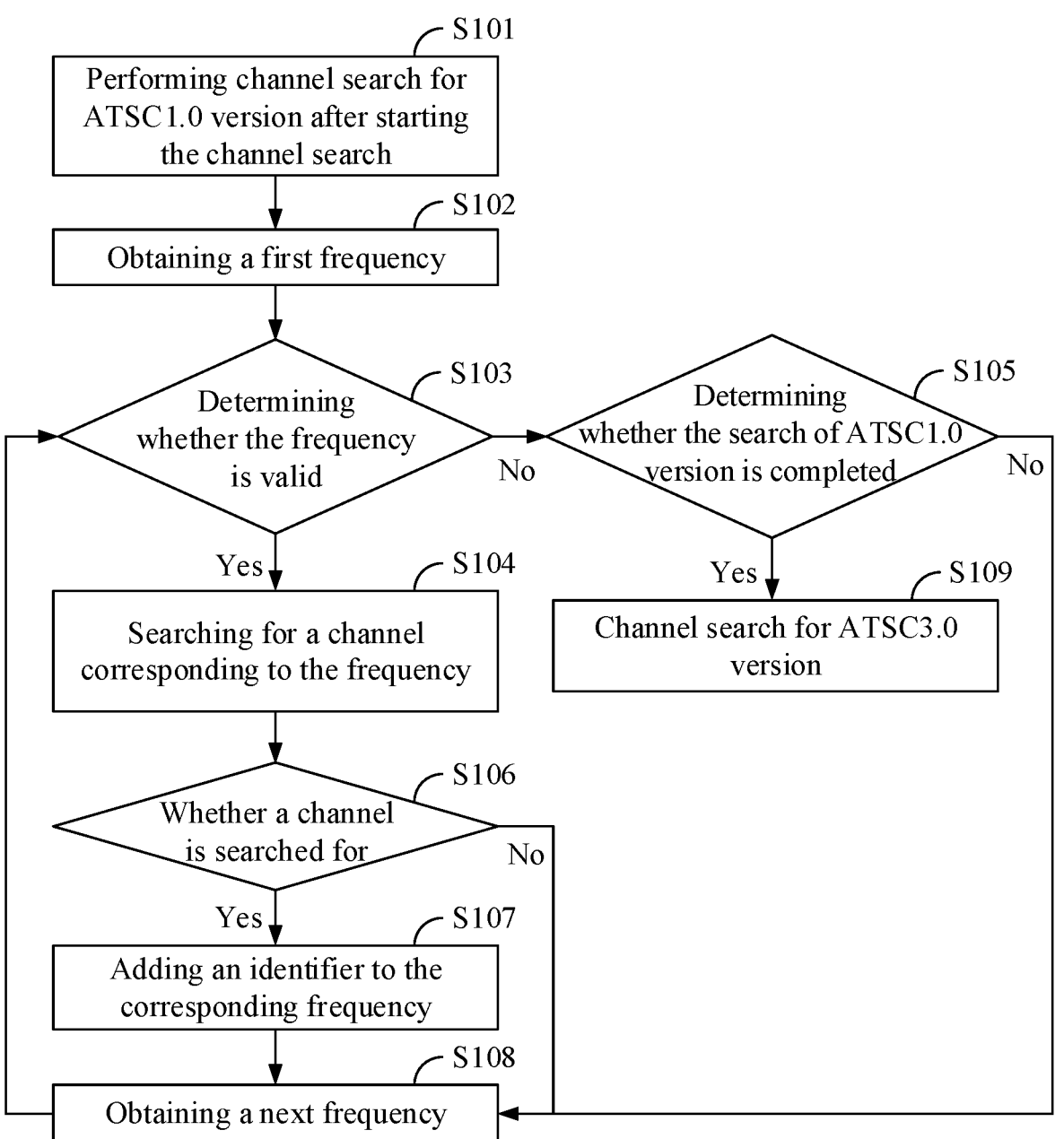

S101

Performing channel search for
ATSC1.0 version after starting
the channel search

S102

Obtaining a first frequency

S103

Determining
whether the frequency
is valid

Yes

S104

Searching for a channel
corresponding to the frequency

S106

Whether a channel
is searched for

No

Yes

S107

Adding an identifier to the
corresponding frequency

S108

Obtaining a next frequency

No

S105

Determining
whether the search of ATSC1.0
version is completed

No

Yes

S109

Channel search for ATSC3.0
version

FIG. 6

METHOD FOR SEARCHING FOR CHANNELS AND DISPLAY APPARATUS

CROSS-REFERENCE TO RELATED APPLICATIONS

The disclosure is a continuation application of International Application No. PCT/CN2022/111526, filed on Aug. 10, 2022, which claims priorities to Chinese Patent Application No. 202110912143.X filed on Aug. 10, 2021 and Chinese Patent Application No. 202110932457.6 filed on Aug. 13, 2021, which are hereby incorporated by reference in their entirety.

TECHNICAL FIELD

The disclosure relates to the field of channel search technology, and particularly to a channel search method and a display apparatus.

BACKGROUND

With the rapid development of display apparatuses, the functions of display apparatuses will become more and more abundant, and the performance will also become more and more powerful. Currently, the display apparatuses include smart TVs, mobile phones, refrigerators, and other products with smart display screens. When the display apparatus is used as a smart TV, a user can watch programs through various channels provided by the smart TV.

When the smart TV is used for the first time or updates TV channels, there is a need to perform a channel search operation to realize the corresponding setting of TV channels and frequencies. At present, in order to realize the corresponding setting of TV channels and frequencies, it is necessary to search each frequency multiple times during performing the channel search operation, which greatly reduces the efficiency of channel search and thus affects the user's experience.

SUMMARY

An embodiment of the disclosure provides a display apparatus, including: a display configured to present an image from a broadcast system; a user input interface configured to receive an instruction; and at least one processor configured to execute instructions to cause the display apparatus to: in response to a channel search instruction, obtain a frequency of a channel to be searched in a first list of frequencies, and perform channel search to obtain a first-type broadcast channel; skip one or more frequencies corresponding to the first-type broadcast channel, and perform channel search based on remaining frequencies in the first list of frequencies to obtain a second-type broadcast channel.

An embodiment of the disclosure further provides a channel search method for a display apparatus, and the method includes: in response to a channel search instruction, obtaining a frequency of a channel to be searched in a first list of frequencies, and performing channel search to obtain a first-type broadcast channel; skipping one or more frequencies corresponding to the first-type broadcast channel, and performing channel search based on remaining frequencies in the first list of frequencies to obtain a second-type broadcast channel.

BRIEF DESCRIPTION OF FIGURES

FIG. 6 shows a data flow diagram of channel search based on the first broadcast version according to some embodiments.

DETAILED DESCRIPTION

In order to make the purposes and embodiments of the disclosure clearer, the exemplary embodiments of the disclosure will be described clearly and completely below in combination with the accompanying drawings in the exemplary embodiments of the disclosure. Obviously, the described exemplary embodiments are a part of the embodiments of the disclosure but not all the embodiments.

It should be noted that the brief description of the terms in the disclosure is only for the convenience of understanding the embodiments described hereafter, and is not intended to limit the embodiments of the disclosure. Unless otherwise specified, these terms should be understood according to the ordinary and ordinary meanings.

The terms "first", "second", "third" and the like in the specification and claims as well as the above drawings in the disclosure are used to distinguish similar or homogeneous objects or entities, but not necessarily meant to limit a particular order or sequence, unless otherwise indicated. It should be understood that the terms so used are interchangeable under appropriate circumstances.

Figure 1:
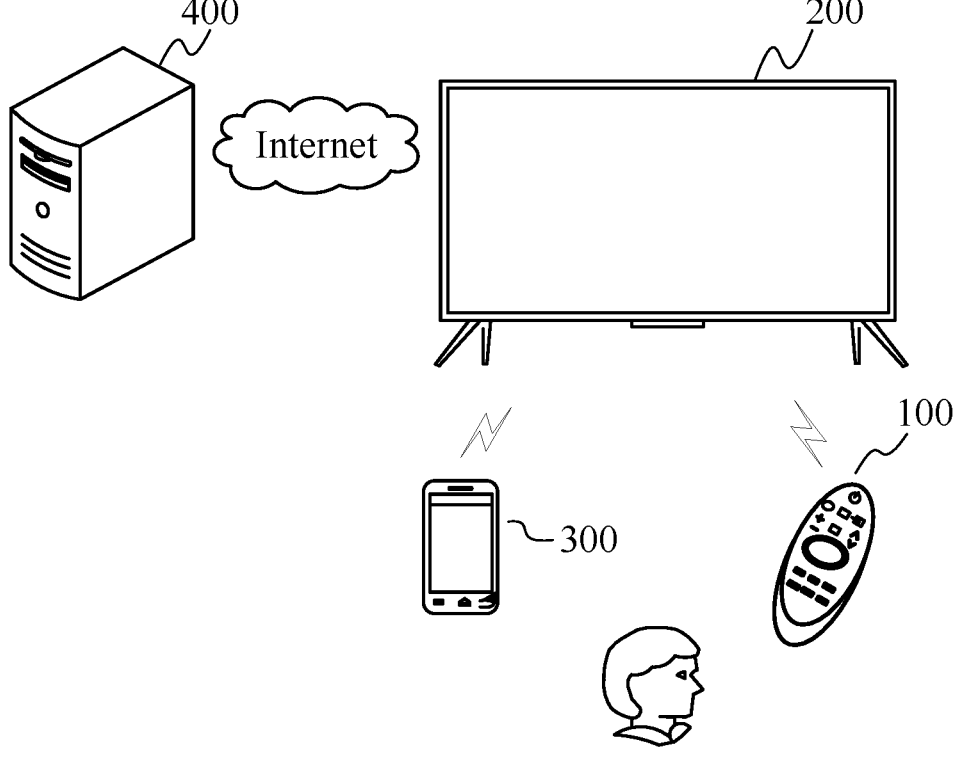
FIG. 1 shows a schematic diagram of an operation scene between a display apparatus and a control device according to some embodiments.

FIG. 1 shows a schematic diagram of an operation scene between a display apparatus and a control device according to some embodiments. As shown in FIG. 1, a user may operate a display apparatus 200 through a smart device 300 or a control device 100.

In some embodiments, the control device 100 may be a remote control, and the communication between the remote control and the display apparatus includes infrared protocol communication or Bluetooth protocol communication and other short-range communication methods. The display apparatus 200 is controlled wirelessly or wiredly. The user may input user commands through the keys on the remote control, voice inputs, control panel inputs, etc. to control the display apparatus 200.

In some embodiments, the smart device 300 (e.g., a mobile terminal, a tablet computer, a computer, a notebook computer, etc.) may also be used to control the display apparatus 200. For example, an application program running on the smart device is used to control the display apparatus 200.

In some embodiments, the display apparatus 200 may also be controlled in a manner other than the control device 100 and the smart device 300. For example, the user's voice command control may be directly received by a module for acquiring voice commands configured inside the display apparatus 200, or the user's voice command control may be received by a voice control device provided outside the display apparatus 200.

In some embodiments, the display apparatus 200 also communicates data with the server 400. The display apparatus 200 may be allowed to perform the communication and connection through a Local Area Network (LAN), a Wireless Local Area Network (WLAN), and other networks. The server 400 may provide various contents and interactions to the display apparatus 200. The server 400 may be one or more clusters, and may include one or more types of servers.

Figure 2:
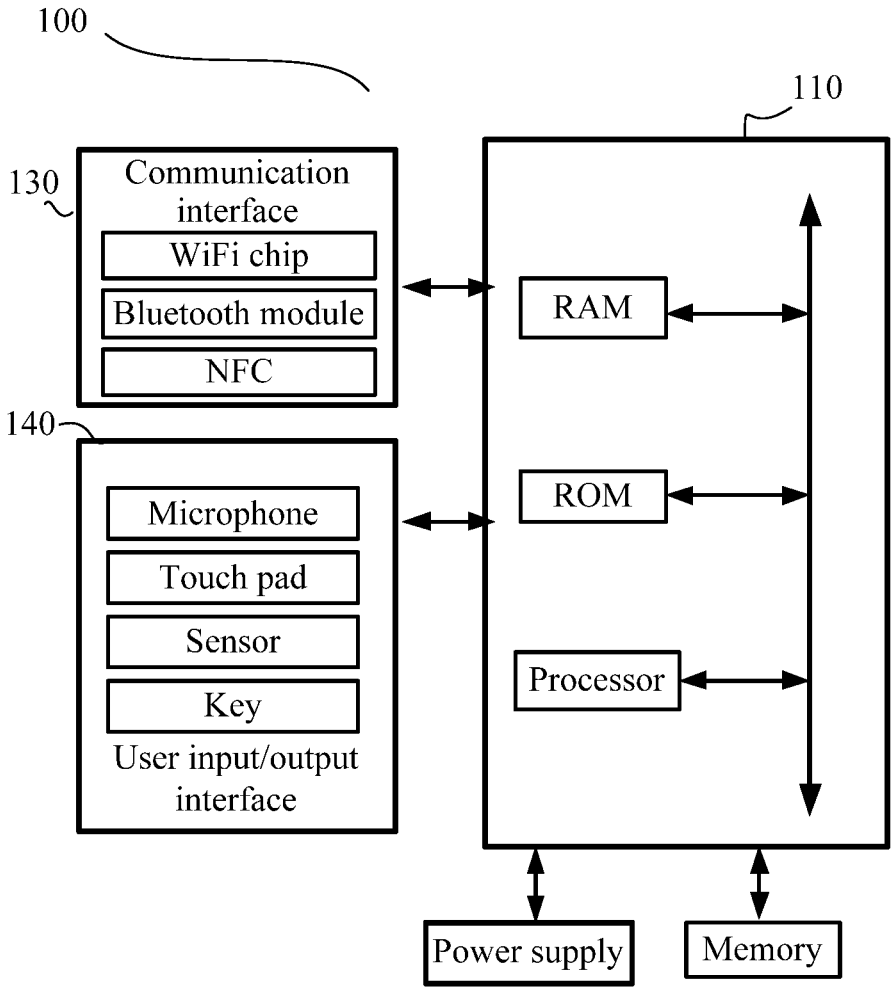
FIG. 2 shows a configuration block diagram of the control device 100 according to some embodiments.

FIG. 2 shows a configuration block diagram of the control device 100 according to some embodiments. As shown in FIG. 2, the control device 100 includes a processor 110, a communication interface 130, a user input/output interface 140, a memory, and a power supply. The control device 100 may receive an input operation command of a user and convert the operation command into an instruction that can be recognized and responded by the display apparatus 200, playing an intermediary role between the user and the display apparatus 200.

Figure 3:
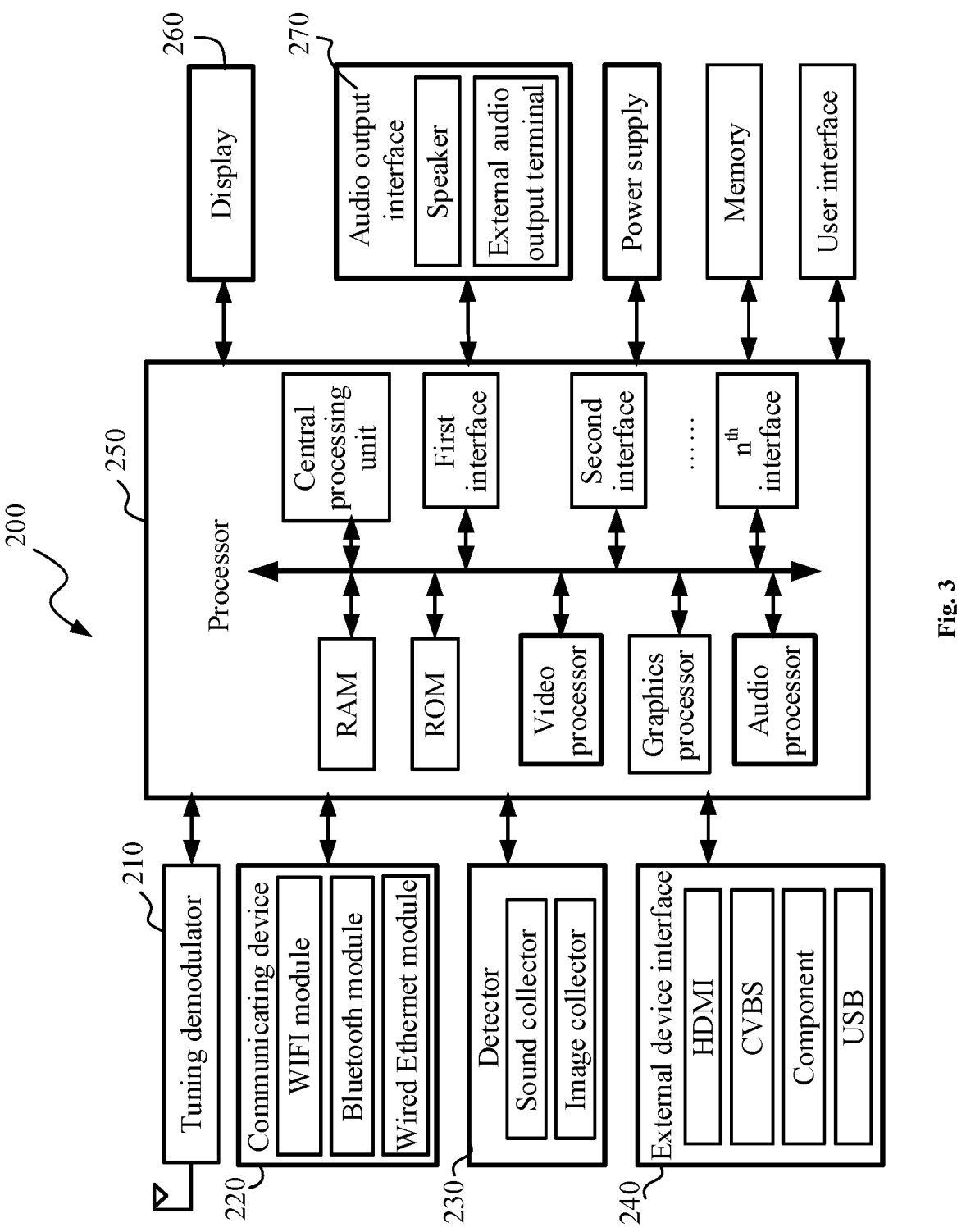
FIG. 3 shows a block diagram of a hardware configuration of the display apparatus 200 according to some embodiments.

FIG. 3 shows a block diagram of a hardware configuration of the display apparatus 200 according to some embodiments. Referring to FIG. 3, in some embodiments, the display apparatus 200 includes at least one of a tuning demodulator 210, a communicating device 220, a detector 230, an external device interface 240, a processor 250, a display 260, an audio output interface 270, a memory, a power supply, and a user input interface.

In some embodiments, the processor includes a processor, a video processor, an audio processor, a graphics processor, an RAM, an ROM, first to $n^{th}$ interfaces for input/output.

In some embodiments, the display 260 includes: a display screen component for presenting a picture, a driver component for driving the image display, a component for receiving an image signal output from the processor to display the video content and image content as well as a menu control interface, and a user control UI interface.

In some embodiments, the display 260 may be a liquid crystal display, an OLED display or a projection display, or may be a projection device and a projection screen.

In some embodiments, the communicating device 220 is a component for communicating with an external device or server according to various types of communication protocols. For example, the communicating device may include at least one of a Wifi module, a Bluetooth module, a wired Ethernet module, other network communication protocol chip or near-field communication protocol chip, and an infrared receiver. The display apparatus 200 may establish the transmission and reception of control signals and data signals with the external control device 100 or the server 400 through the communicating device 220.

In some embodiments, the user input interface may be configured to receive a control signal of the control device 100 (e.g., infrared remote control, etc.).

In some embodiments, the detector 230 is configured to collect the external environment or interactive signals with the outside. For example, the detector 230 includes a light receiver, which is a sensor for collecting the intensity of the ambient light; or the detector 230 includes an image collector, such as a camera, which may be used to collect external environment scenes, user attributes or user interaction gestures; or the detector 230 includes a sound collector, such as a microphone, which is used to receive external sounds.

In some embodiments, the external device interface 240 may include, but is not limited to, any one or more of a High-Definition Multimedia Interface (HDMI), an analog or data high-definition component input interface (Component), a Composite Video Broadcast Signal (CVBS) input interface, a USB input interface (USB), an RGB port. The external device interface 240 may also be a composite input/output interface formed of a plurality of interfaces described above.

In some embodiments, the tuning demodulator 210 receives the broadcast television signals by a wired or wireless receiving method, and demodulates audio and video signals and EPG data from a plurality of wireless or wired broadcast television signals, for example, demodulates audio and video signals and EPG data from DTV signals or ATV signals.

In some embodiments, the processor 250 and the tuning demodulator 210 may be located in different separate devices, that is, the tuning demodulator 210 may also be located in an external device (such as an external set-top box, etc.) of the main device where the processor 250 is located.

In some embodiments, the processor 250 controls the operations of the display apparatus and responds to the user's operations through various software control programs stored in the memory. The processor 250 controls the overall operation of the display apparatus 200. For example, in response to receiving a user command for selecting a UI object displayed on the display 260, the processor 250 may perform the operations related to the object selected by the user command.

In some embodiments, the object may be any one of selectable objects, e.g., hyperlink, icon or other manipulable control. The operations related to the selected object include: the operation of displaying the connection to the hyperlink page, document, image or the like, or the operation of executing the program corresponding to the icon.

In some embodiments, the processor includes at least one of a Central Processing Unit (CPU), a video processor, an audio processor, a Graphics Processing Unit (GPU), an RAM (Random Access Memory), an ROM (Read-Only Memory), first to $n^{th}$ interfaces for input/output, a communication bus (Bus), etc.

The CPU processor is used to execute the operating system and application instructions stored in the memory, and execute various applications, data and content according to various interactive instructions received from the outside, so as to finally display and play various audio and video contents. The CPU processor may include a plurality of processors, for example, include a main processor and one or more sub-processors.

In some embodiments, the graphics processor is used to generate various graphics objects, such as icons, operation menus, display graphics of user input instructions, etc. The graphics processor includes: an arithmetic unit that performs operations by receiving various interactive commands input by users and displays various objects according to the display attributes; and a renderer that renders various objects obtained based on the arithmetic unit and presents the rendered objects on the display.

In some embodiments, the video processor is used to receive an external video signal and perform decompression, decoding, scaling, noise reduction, frame rate conversion, resolution conversion, image synthesis and other video processing according to the standard codec protocol of the input signal, to obtain a signal that can be displayed or played directly on the display apparatus 200.

In some embodiments, the video processor includes a de-multiplexing module, a video decoding module, an image synthesis module, a frame rate conversion module, a display formatting module, etc. Here, the de-multiplexing module is used to de-multiplex an input audio and video data stream. The video decoding module is used to process the demultiplexed video signal, including decoding and scaling, etc. The image synthesis module, such as image synthesizer, is used to superimpose and mix the GUI signal generated by a graphics generator according to the user input or by itself with the scaled video image, to generate an image signal for display. The frame rate conversion module is used to convert the frame rate of the input video. The display formatting module is used to change the received video output signal after the frame rate conversion to a signal conforming to the display format, e.g., output an RGB data signal.

In some embodiments, the audio processor is used to receive an external audio signal, and perform decompression, decoding, noise reduction, digital-to-analog conversion and amplification, etc. according to the standard codec protocol of the input signal, to obtain a sound signal that can be played in the speaker.

In some embodiments, the user may input a user command on the Graphical User Interface (GUI) displayed on the display 260, and the user input interface receives the user input command through the Graphical User Interface (GUI). Alternatively, the user may input a user command by inputting the particular sound or gesture, and the user input interface recognizes the sound or gesture through the sensor to receive the user input command.

Figure 4:
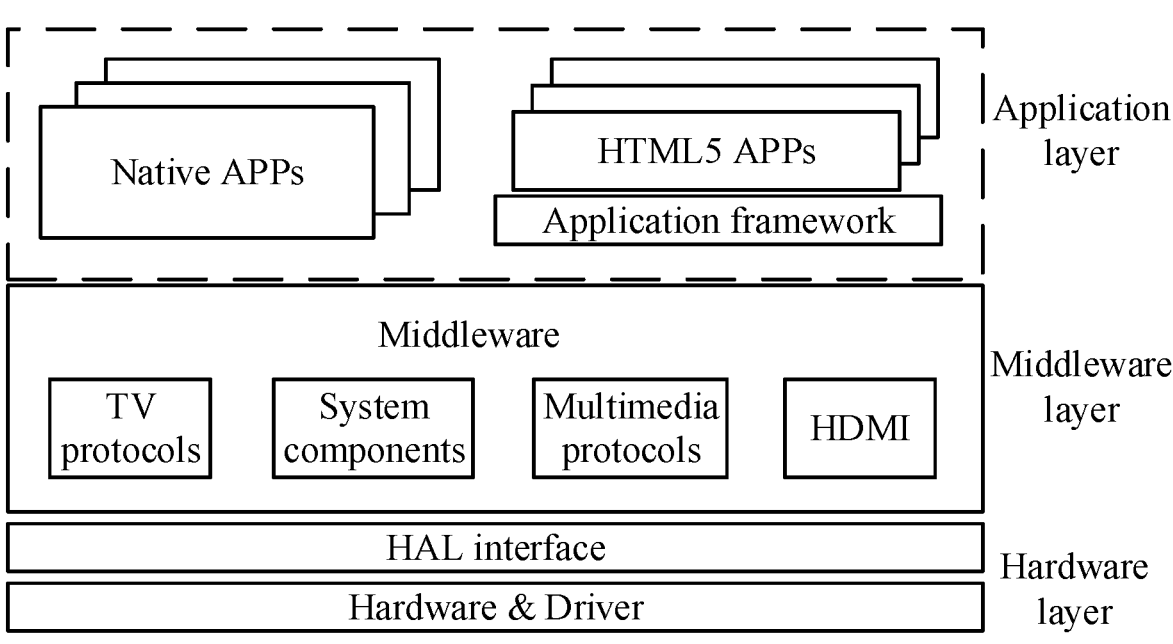
FIG. 4 shows a software configuration diagram in the display apparatus 200 according to some embodiments.

FIG. 4 shows a software configuration diagram in the display apparatus 200 according to some embodiments. As shown in FIG. 4, the system of the display apparatus is divided into three layers, which are respectively an application layer, a middleware layer and a hardware layer from top to bottom.

The application layer mainly includes common applications on TV and Application Framework, where the common applications are mainly applications developed based on Browser, such as: HTML5 APPs; and native applications (Native APPs).

The Application Framework is a complete program model, with all the basic functions required by the standard application software, such as: file access, data exchange, . . . , and the use interfaces (toolbar, status bar, menu, dialog) of these functions.

The Native APPs can support online or offline, message push or local resource access.

The middleware layer includes middleware such as various TV protocols, multimedia protocols and system components. The middleware can use the basic services (functions) provided by the system software to connect various parts of the application system or different applications on the network, and can achieve the purpose of resource sharing and function sharing. For example, the middleware layer may include services or components for supporting the ATSC protocol.

The hardware layer mainly includes an HAL interface, hardware and drivers, where the HAL interface is a unified interface for all TV chips, and the specific logic is implemented by each chip. The drivers mainly include: audio driver, display driver, Bluetooth driver, camera driver, WIFI driver, USB driver, HDMI driver, sensor driver (such as fingerprint sensor, temperature sensor, pressure sensor, etc.), and power driver, etc.

Embodiments of the disclosure provide the above-mentioned display apparatus. In a specific embodiment, the display apparatus may include more modules than those in the above-mentioned drawings, or delete some of the modules. In some specific embodiments, the display apparatus includes: a user input interface configured to receive a channel search instruction; and a processor configured to: in response to the channel search instruction, obtain a frequency of a channel to be searched, and perform channel search to obtain a first-type broadcast channel; skip a frequency corresponding to the first-type broadcast channel, and perform channel search based on remaining frequencies to obtain a second-type broadcast channel. In some embodiments, the display apparatus may be in the form of a smart TV, may include modules such as a modem shown in FIG. 3, and may be controlled by a remote control.

In some embodiments, the display apparatus includes a user input interface and a processor. The user input interface is configured to receive a channel search instruction; and the processor is configured to perform channel search in response to the channel search instruction. Firstly, the frequencies of the channels to be searched are obtained, the channel search is performed based on all the obtained frequencies to obtain the first-type broadcast channel, and the frequency corresponding to the first-type broadcast channel is determined. Then, the frequency corresponding to the first-type broadcast channel is skipped among all the obtained frequencies, and then the channel search is performed again based on the remaining frequencies to obtain the second-type broadcast channel. Here, one frequency corresponds to one channel, and a frequency is equivalent to a channel number. Different frequencies correspond to different signal frequencies, so that the channels searched for different frequencies are different. The frequency provided by the embodiments of the disclosure has the same concept as the frequency mentioned in the Digital Video Broadcasting (DVB) protocol. After a frequency is locked, signals with frequencies within a certain range can be received. For example, a frequency of 213 MHz is locked, the bandwidth is 6M, and signals of 213±3 MHz can be received. The channels that can be loaded by each frequency are limited, so it is necessary to receive each frequency and perform channel search for each frequency separately.

The channels provided by the two broadcast versions are different. Therefore, when performing channel search, the display apparatus needs to firstly search channels of one broadcast version of ATSC completely and then search channels of the other broadcast version of ATSC completely based on frequencies. One frequency corresponds to one channel. Since the channels provided by two broadcast versions of ATSC do not exist for the same frequency, all channels of two broadcast versions of ATSC are completely searched during channel search, resulting in a long time for the overall channel search.

In some embodiments, when the display apparatus is used as a smart TV, the smart TV may provide channels so that users can watch corresponding programs. In order to provide channels, the display apparatus needs to use the digital terrestrial broadcast standard (Advanced Television Systems Committee (ATSC)) for channel search. The digital terrestrial broadcast standard (ATSC) includes different broadcast versions, for example, ATSC1.0 version and ATSC3.0 version. The channels provided by the two broadcast versions are different, and the display apparatus is compatible with the channels provided by the two broadcast versions.

The configuration of the display apparatus includes a frequency list of several frequencies, one frequency corresponds to one channel, and a frequency is equivalent to a channel number. Different frequencies correspond to different signal frequencies, so that the channels searched for different frequencies are different. For example, the signal frequency corresponding to the frequency 13 in ATSC1.0 version is different from the signal frequency corresponding to the frequency 13 in ATSC3.0 version, so the frequency 13 can only search for channels provided by ATSC1.0 version or ATSC3.0 version.

When performing channel search, the display apparatus needs to firstly search channels of ATSC1.0 version completely based on frequencies, and save the searched channels of ATSC1.0 version; and then search channels of ATSC3.0 version completely, and save the searched channels of ATSC3.0 version.

The channels provided by two ATSC broadcast versions do not exist for the same frequency, and the frequencies for which the channels have been searched in ATSC1.0 version are not filtered out in the channel search for ATSC3.0 version after the channel search for ATSC1.0 version is completed, so that all frequencies will be detected one by one again in ATSC3.0 version, and the repeated search of frequencies will result in a long time for the overall channel search.

Therefore, in order to improve the channel search efficiency, an embodiment of the disclosure provides a display apparatus, where the frequencies for which the channels have been searched are set as frequencies of ATSC1.0 version during channel search for ATSC1.0 version. During channel search for ATSC3.0 version, the frequencies of ATSC1.0 version are skipped, greatly reducing the time of channel search for ATSC3.0 version.

Figure 5:
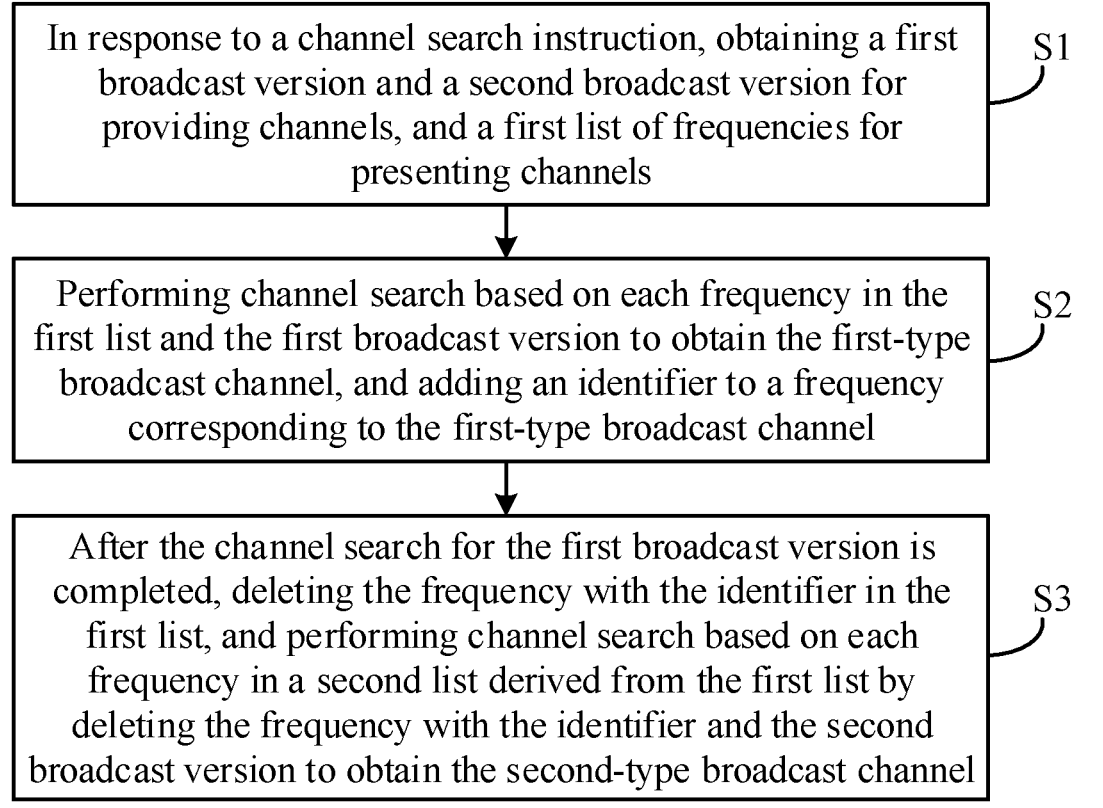
FIG. 5 shows a flowchart of a channel search method according to some embodiments.

FIG. 5 shows a flowchart of a channel search method according to some embodiments. A display apparatus provided by an embodiment of the disclosure includes: a display configured to present an image, the image including a decoded image from a broadcast signal, a user interface image for interacting with a user, etc.; and a processor in connection with the display. When executing the channel search method shown in FIG. 5, the processor is configured to perform the following steps.

S1: in response to a channel search instruction, obtaining a first broadcast version and a second broadcast version for providing channels, and a first list of frequencies for presenting channels.

When a user operates the display apparatus to perform channel search, the user can select and activate the channel search function configured on the display apparatus through an instruction received by the user input interface from the remote control, and the channel search instruction is generated synchronously.

The first list of frequencies for presenting channels is obtained based on the channel search instruction, where the first list includes several frequencies, and one frequency corresponds to one channel. At the same time, the first broadcast version and the second broadcast version are obtained for channel search, and a corresponding channel is searched based on each frequency.

The first broadcast version may be ATSC1.0 version, and the second broadcast version may be ATSC3.0 version. Different channels provided by the first broadcast version (ATSC1.0 version) correspond to different signal frequencies, and different channels provided by the second broadcast version (ATSC3.0 version) correspond to different signal frequencies.

S2: performing channel search based on each frequency in the first list and the first broadcast version to obtain the first-type broadcast channel, and adding an identifier to a frequency corresponding to the first-type broadcast channel.

The second broadcast version is an updated version based on the first broadcast version, so the channel search is usually performed based on the lower version of ATSC during channel search firstly.

Therefore, the channel search can be performed based on each frequency in the first list of frequencies and the first broadcast version, that is, the signal frequency corresponding to each frequency is compared with the signal frequency corresponding to each channel provided by the first broadcast version. If there is a consistent signal frequency in comparison, the corresponding first-type broadcast channel can be obtained for the frequency corresponding to this signal frequency.

The first-type broadcast channel refers to a channel provided by the first broadcast version (ATSC1.0 version). If there are multiple frequencies for which the corresponding first-type broadcast channels are searched in the first broadcast version in the frequency list, multiple first-type broadcast channels can be obtained. One frequency corresponds to one signal frequency and one first-type broadcast channel, and the three are in one-to-one correspondence.

FIG. 6 shows a data flow diagram of channel search based on the first broadcast version according to some embodiments. In some embodiments, referring to FIG. 6, when performing channel search based on the first broadcast version, the processor performs channel search based on each frequency in the frequency list and the first broadcast version to obtain the first-type broadcast channel, and is further configured to perform the following steps:

obtaining a target frequency in the frequency list in sequence, and determining whether the target frequency is valid;

in response to the target frequency being valid, performing channel search based on the target frequency and the first broadcast version to obtain the first-type broadcast channel; and in response to the target frequency being invalid and after all frequencies in the frequency list have completed channel search, determining that the channel search for the first broadcast version is completed.

When performing channel search based on the first broadcast version, the channel search may be performed sequentially based on each frequency in the frequency list. The frequencies in the frequency list are arranged in ascending order of signal frequency, the signal frequency of the first frequency is the smallest, and the signal frequency of the last frequency is the largest.

The first frequency is firstly obtained, and it is judged whether the first frequency is valid. The "valid" means that the signal frequency of the frequency does not exceed a frequency range, where the frequency range is used to represent the signal frequency threshold of searchable channels.

In some embodiments, the frequency range can be set as 57 MHz to 803 MHz. If the frequency list has 1 to 50 frequencies, meaning that there are 50 channels, then 57

MHz is the smallest signal frequency, corresponds to the first frequency, and is equivalent to the signal frequency corresponding to the channel with a channel number of 50; and 803 MHz is the largest signal frequency, corresponds to the last frequency, and is equivalent to the signal frequency corresponding to the channel with a channel number of 50. The signal frequency of the frequency less than 57 MHz or greater than 803 MHz is invalid, and the signal frequency of the frequency greater than or equal to 57 MHz and less than or equal to 803 MHz is valid.

If the first frequency is valid, this frequency is within the signal frequency threshold (frequency range) of searchable channels, so the channel search can be performed based on the first frequency and the first broadcast version.

During search, the signal frequency of the first frequency is compared with the signal frequency of each channel provided by the first broadcast version. If there is a consistent signal frequency in comparison, then it is determined that a channel has been searched, and the corresponding first-type broadcast channel is obtained. If there is no consistent signal frequency in comparison, meaning that no channel has been searched, then a next frequency in the frequency list is obtained, and the above process is continued.

After the channel is searched based on the first broadcast version, it means that the channel of this frequency belongs to the first broadcast version, and there will be no channel of the second broadcast version. Therefore, in order to avoid this frequency from being searched again in the channel search process of the second broadcast version, an identifier can be configured for this frequency, so that the search process of the second broadcast version can skip the channel search process of this frequency, avoiding repeated search and improving the search efficiency.

When searching for a channel provided by the first broadcast version for each frequency in the frequency list based on the aforementioned method, if some frequencies can be matched to the corresponding first-type broadcast channels, then the identifiers are added to the frequencies corresponding to the first-type broadcast channels, and this type of frequencies are marked as ATSC1.0 version. The identifier is used to indicate that the channel corresponding to the frequency comes from the first-type broadcast channel provided by the first broadcast version, and indicates that the channel search for the frequency has been completed.

For example, if three frequencies 13, 15 and 17 in a frequency list are ATSC1.0 version, after starting the channel search for ATSC1.0 version, the corresponding first-type broadcast channel A is searched for the frequency 13, the corresponding first-type broadcast channel B is searched for the frequency 15, and the corresponding first-type broadcast channel C is searched for the frequency 17. At this time, the identifiers are added to the frequencies 13, 15 and 17 respectively, so as to mark the frequencies 13, 15 and 17 as ATSC1.0 version.

In some embodiments, if the target frequency obtained from the frequency list is invalid, it means that the target frequency may not be within the signal frequency threshold (frequency range) of searchable channels, that is, the signal frequency of the target frequency exceeds the frequency range. Therefore, it can be further judged whether the channel search process of the first broadcast version is completed.

The signal frequency of a certain frequency exceeds the frequency range, which could be accidental circumstance, for example, caused by the abnormal signal or other reasons. Therefore, in order to accurately judge whether the channel search process of the first broadcast version is completed, it can be determined by determining whether the serial number of the currently invalid target frequency is the largest frequency number in the frequency list. If the serial number of the invalid target frequency is not the largest frequency number, it can be determined that the channel search for the first broadcast version is not completed, and the next frequency can be obtained to continue the aforementioned process; if the serial number of the invalid target frequency is the largest frequency number, it can be determined that the channel search for the first broadcast version is completed.

For example, if the frequency list includes 50 frequencies, when a certain frequency is obtained, the frequency is invalid because the signal frequency exceeds the frequency range. Then, the serial number of the target frequency is further obtained as 48, which is not the largest frequency number of 50, it can be determined that the channel search process of the first broadcast version has not been completed, and the next frequency can continue to be obtained to perform the aforementioned process. If the obtained serial number of the target frequency is 50, which is the largest frequency number of 50, then it can be determined that the channel search for the first broadcast version is completed, and the channel search process of the second broadcast version can be started.

S3: after the channel search for the first broadcast version is completed, deleting the frequency with the identifier in the first list, and performing channel search based on each frequency in a second list derived from the first list by deleting the frequency with the identifier and the second broadcast version to obtain the second-type broadcast channel.

Referring to FIG. 6, the process includes the following steps.

S101: performing channel search for ATSC1.0 version after starting the channel search, and proceeding to S102.

S102: obtaining a first frequency, and proceeding to S103.

S103: determining whether the frequency is valid; if so, proceeding to S104; if not, proceeding to S105.

S104: searching for a channel corresponding to the frequency, and proceeding to S106.

S106: whether a channel is searched for; if so, proceeding to S107; if not, proceeding to S108.

S107: adding an identifier to the corresponding frequency, and proceeding to S108.

S108: obtaining a next frequency, and proceeding to S103.

S105: determining whether the search of ATSC1.0 version is completed; if so, proceeding to S109; if not, proceeding to S108.

S109: channel search for ATSC3.0 version.

Figure 7:
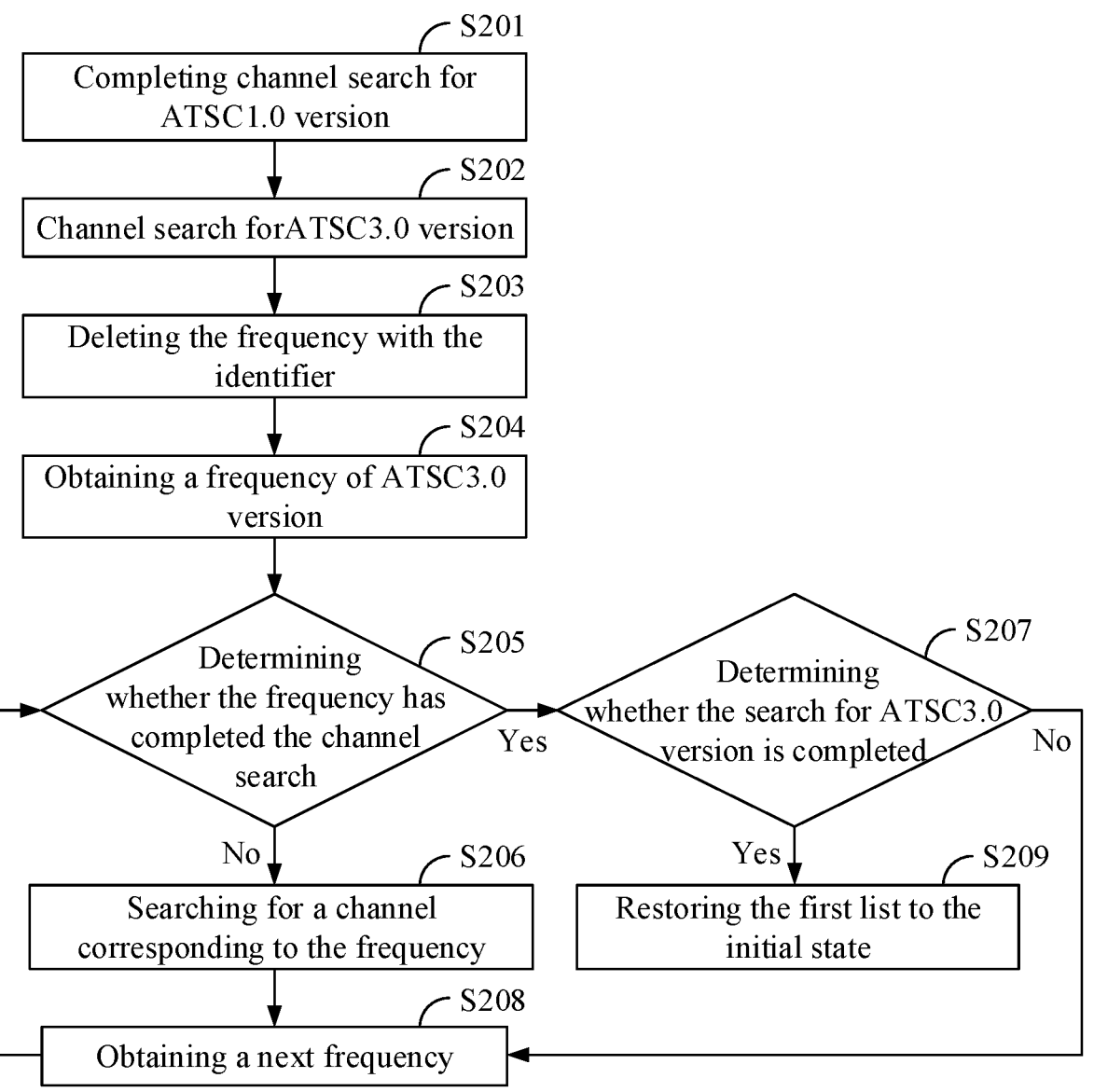
FIG. 7 shows a data flow diagram of channel search based on the second broadcast version according to some embodiments.

FIG. 7 shows a data flow diagram of channel search based on the second broadcast version according to some embodiments. Referring to FIG. 7, after the channel search process of the first broadcast version (ATSC1.0 version) is completed, the corresponding channels can be searched for the remaining frequencies in the frequency list based on the second broadcast version (ATSC3.0 version).

During the channel search for the first broadcast version, if some frequencies in the frequency list match the first-type broadcast channels provided by the first broadcast version, the identifiers are added to the corresponding frequencies. Therefore, in order to avoid repeatedly searching the frequencies that already match the first-type broadcast channels when performing channel search based on the second broadcast version, the frequencies with identifiers in the frequency list can be firstly obtained, read out and deleted, or the frequencies with identifiers are skipped during search, and no repeated search process will be performed.

For example, during channel search for the second broadcast version (ATSC3.0 version), firstly the frequency identifiers in the channel search process of the first broadcast version are obtained, that is, the marked frequencies of ATSC1.0 version are obtained. If the frequencies 13, 15 and 17 with identifiers are obtained, these frequencies already have channels of ATSC1.0 version, and will not have channels of ATSC3.0 version at the same time, so the frequencies marked as ATSC1.0 version are removed from the frequency list of ATSC3.0 version, that is, the three frequencies 13, 15 and 17 will not be searched again in the channel search for ATSC3.0 version, shortening the channel search time, and improving the channel search efficiency.

In some embodiments, in the channel search process of the second broadcast version, in addition to skipping the frequencies with identifiers, it is also possible to delete the frequencies with identifiers, generate a second list of frequencies, and then perform the channel search process of the second broadcast version to obtain the second-type broadcast channel. The frequencies in the new frequency list are all frequencies of ATSC3.0 version, and the second-type broadcast channel refers to a channel provided by the second broadcast version (ATSC3.0 version). One frequency corresponds to one signal frequency and one second-type broadcast channel, and the three are in one-to-one correspondence.

In some embodiments, when performing channel search based on the second broadcast version, the processor performs channel search based on each frequency in the obtained new frequency list and the second broadcast version to obtain the second-type broadcast channel, and is further configured to perform the following steps:

obtaining a target frequency in the new frequency list in sequence, and determining whether the target frequency has completed a channel search process;

if the target frequency has not completed the channel search process, performing channel search based on the target frequency and the second broadcast version to obtain the second-type broadcast channel, and obtaining a next target frequency; and if the target frequency has completed the channel search process and after all frequencies in the new frequency list have completed channel search, determining that the channel search for the second broadcast version is completed.

When performing channel search based on the second broadcast version, the channel search may be performed sequentially based on each frequency in the new frequency list. The frequencies in the new frequency list are arranged in ascending order of signal frequency, the signal frequency of the first frequency is the smallest, and the signal frequency of the last frequency is the largest. Since the frequencies with identifiers have been deleted or skipped in the new frequency list, the serial numbers of frequencies in the new frequency list are not continuous.

Firstly the first frequency in the new frequency list is obtained, and it is judged whether the first frequency has completed the channel search process. Completing the channel search process means that the corresponding frequency has already matched with a second-type broadcast channel. If a frequency has been matched with a second-type broadcast channel, it means that this frequency has completed the channel search process of the second broadcast version. In order to avoid repeated search, the channel search process is no longer performed for this frequency.

If the frequency has not completed the channel search process, it means that the channel search process of the second broadcast version has not been performed for the frequency. Therefore, the channel search can be performed based on the target frequency and the second broadcast version to obtain the second-type broadcast channel.

During search, the signal frequency of the frequency is compared with the signal frequency of each channel provided by the second broadcast version. If there is a consistent signal frequency in comparison, then it is determined that a channel has been searched, and the corresponding second-type broadcast channel is obtained. After the current frequency completes the channel search, the next frequency in the new frequency list is obtained, and the above process is continued until all the frequencies in the new frequency list have searched for the corresponding second-type broadcast channels.

If the frequency has completed the channel search process, there is a need to further judge whether the channel search process of the second broadcast version is completed, so as to determine whether to end the channel search process. Therefore, in order to accurately judge whether the channel search process of the second broadcast version is completed, it can be determined by determining whether the serial number of the currently completed target frequency is the largest frequency number in the new frequency list. If the serial number of the completed target frequency is not the largest frequency number, it can be determined that the channel search for the second broadcast version is not completed, and the next frequency can be obtained to continue the aforementioned process; if the serial number of the completed target frequency is the largest frequency number, it can be determined that the channel search for the second broadcast version is completed.

For example, if the new frequency list includes 50 frequencies, when a certain frequency is obtained, it is determined that the frequency has completed the channel search process. Then, the serial number of the target frequency is further obtained as 48, which is not the largest frequency number of 50, it can be determined that the channel search process of the second broadcast version has not been completed, and the next frequency can continue to be obtained to perform the aforementioned process. If the obtained serial number of the target frequency is 50, which is the largest frequency number of 50, then it can be determined that the channel search for the second broadcast version is completed.

In some embodiments, after the channel search process of the second broadcast version is completed, the completion status flag needs to be restored. At this time, the processor is further configured to: clear the identifier of each frequency in the frequency list and restore the frequency list to the initial state after the channel search for the second broadcast version is completed.

Referring to FIG. 7, the process includes the following steps.

S201: completing channel search for ATSC1.0 version, and proceeding to S202.

S202: channel search for ATSC3.0 version, and proceeding to S203.

S203: deleting the frequency with the identifier, and proceeding to S204.

S204: obtaining a frequency of ATSC3.0 version, and proceeding to S205.

S205: determining whether the frequency has completed the channel search, if so, proceeding to S206; if not, proceeding to S207.

S206: searching for a channel corresponding to the frequency, and proceeding to S208.

S208: obtaining a next frequency, and proceeding to S205.

S207: determining whether the search for ATSC3.0 version is completed; if so, proceeding to S208; if not, proceeding to S209.

S209: restoring the first list to the initial state.

When the channel search process of the second broadcast version is completed, it means that the current whole channel search process of the display apparatus is completed. Therefore, in order to avoid affecting the next channel search process, the identifiers added for some frequencies during the channel search process of the first broadcast version may be cleared after the channel search for the second broadcast version is completed, so that each frequency in the frequency list is restored to the initial state, where the initial state refers to a state in which each frequency has no identifier.

In some embodiments, when the display apparatus performs channel search, the frequency search information may be correspondingly displayed on the user interface. For example, when the channel search is performed based on the first broadcast version, the search result of the frequencies of ATSC1.0 version may be displayed. When the channel search is performed based on the second broadcast version, the frequencies for which the channels of ATSC1.0 version have been obtained are skipped, so the search result of the frequencies of ATSC1.0 version can no longer be displayed, and only the search result of the frequencies of ATSC3.0 version is displayed.

In some embodiments, when the channel search is performed based on the second broadcast version, in order to bring a better experience to the user, a corresponding prompt may be given to the user when skipping is performed. At this point, the processor is further configured to perform the following steps:

generating the search skip information based on the frequency with the identifier when performing channel search based on the second broadcast version; and skipping a channel search process corresponding to the frequency with the identifier when obtaining an original position of the frequency with the identifier in the new frequency list, and presenting the corresponding search skip information in a user interface.

When performing channel search based on the second broadcast version, the skip operation is performed when the frequency at the original position of the frequency with the identifier is obtained, and the search skip information (for example, "ATSC1.0 frequency-index-skip") is generated based on the frequency with the identifier.

The obtained original position of the frequency with the identifier refers to the position of the frequency with the identifier when the frequency is obtained based on the original frequency list. For example, if three frequencies 13, 15 and 17 are ATSC1.0 version and have identifiers in the original frequency list, the three frequencies 13, 15 and 17 do not exist in the new frequency list. However, when performing the channel search process of the second broadcast version, if the frequency 12 is obtained, the frequency 13 should be obtained next, but the frequency 13 does not exist, so the search jump information is displayed at the position where the frequency 13 should be obtained, to indicate that the channel search process of the frequency 13 is skipped and no longer performed.

After the frequency 14 is continuously obtained, the search result corresponding to the frequency 14 can be displayed again; when the frequency 15 is obtained, the search skip information corresponding to the frequency 15 is displayed, and so on.

As can be seen, when performing channel search, the display apparatus firstly performs channel search based on the ATSC1.0 version. If a channel can be searched for a frequency, an identifier is set for this frequency, indicating that the channel search has been completed for this frequency. After all the channels of ATSC1.0 version have been searched, the channel search is performed based on ATSC3.0 version. At this time, the frequency list is firstly checked, the frequency with the identifier is removed, a second list of frequencies is generated, and then the channel search is performed according to the new frequency list, so as to improve the channel search efficiency.

As can be seen from the above, when performing channel search, the display apparatus provided by the embodiments of the disclosure firstly performs channel search based on each frequency in the frequency list and the first broadcast version to obtain the first-type broadcast channel, and adds an identifier to the frequency corresponding to the first-type broadcast channel; deletes the frequency with the identifier in the frequency list after the channel search for the first broadcast version is completed, and performs channel search based on each frequency in the obtained new frequency list and the second broadcast version to obtain the second-type broadcast channel. It can be seen that the display apparatus can skip frequencies with identifiers when performing channel search based on the second broadcast version by marking the frequencies for which the channel search for the first broadcast version has been completed, avoiding repeated searches of certain frequencies, reducing the time of the channel search for the second broadcast version, and improving the efficiency of the channel search.

A channel search method for the display apparatus provided by an embodiment of the disclosure includes: receiving a channel search instruction; in response to the channel search instruction, obtaining a frequency of a channel to be searched, and performing channel search to obtain a first-type broadcast channel; skipping a frequency corresponding to the first-type broadcast channel, and performing channel search based on remaining frequencies to obtain a second-type broadcast channel.

In a specific embodiment, the display apparatus receives the channel search instruction through the user input interface, and performs channel search in response to the channel search instruction through the processor. When performing channel search in response to the channel search instruction, the display apparatus firstly obtains the frequencies of the channels to be searched, performs channel search based on all the obtained frequencies to obtain the first-type broadcast channel, and determines the frequency corresponding to the first-type broadcast channel. Then, the frequency corresponding to the first-type broadcast channel is skipped among all the obtained frequencies, and then the channel search is performed again based on the remaining frequencies to obtain the second-type broadcast channel.

FIG. 5 shows a flowchart of a channel search method according to some embodiments. Referring to FIG. 5, the disclosure further provides a channel search method, which is executed by the processor and related modules in the display apparatus provided by the above-mentioned embodiments. The method includes the following steps.

S1: in response to a channel search instruction, obtaining a first broadcast version and a second broadcast version for providing channels, and a first list of frequencies for presenting channels.

S2: performing channel search based on each frequency in the first list and the first broadcast version to obtain the first-type broadcast channel, and adding an identifier to a frequency corresponding to the first-type broadcast channel.

S3: after the channel search for the first broadcast version is completed, deleting the frequency with the identifier in the first list, and performing channel search based on each frequency in a second list derived from the first list by deleting the frequency with the identifier and the second broadcast version to obtain the second-type broadcast channel.

In some embodiments of the disclosure, the performing channel search based on each frequency in the frequency list and the first broadcast version to obtain the first-type broadcast channel, includes: obtaining a target frequency in the frequency list in sequence, and determining whether the target frequency is valid; if the target frequency is valid, performing channel search based on the target frequency and the first broadcast version to obtain the first-type broadcast channel; and if the target frequency is invalid and after all frequencies in the frequency list have completed channel search, determining that the channel search for the first broadcast version is completed.

In some embodiments of the disclosure, the performing channel search based on each frequency in the obtained new frequency list and the second broadcast version to obtain the second-type broadcast channel, includes: obtaining a target frequency in the new frequency list in sequence, and determining whether the target frequency has completed a channel search process; if the target frequency has not completed the channel search process, performing channel search based on the target frequency and the second broadcast version to obtain the second-type broadcast channel, and obtaining a next target frequency; and if the target frequency has completed the channel search process and after all frequencies in the new frequency list have completed channel search, determining that the channel search for the second broadcast version is completed.

In some embodiments of the disclosure, the method further includes: generating search skip information based on the frequency with the identifier when performing channel search based on the second broadcast version; and skipping a channel search process corresponding to the frequency with the identifier when obtaining an original position of the frequency with the identifier in the new frequency list, and presenting the corresponding search skip information in a user interface.

In some embodiments of the disclosure, the method further includes: clearing an identifier of each frequency in the frequency list and restoring the frequency list to an initial state after the channel search for the second broadcast version is completed.

As can be seen from the above, in the channel search method and the display apparatus provided by the embodiments of the disclosure, when the channel search is performed, the channel search is firstly performed based on each frequency in the frequency list and the first broadcast version to obtain the first-type broadcast channel, and an identifier is added to the frequency corresponding to the first-type broadcast channel; the frequency with the identifier in the frequency list is deleted after the channel search for the first broadcast version is completed, and the channel search is performed based on each frequency in the obtained new frequency list and the second broadcast version to obtain the second-type broadcast channel. It can be seen that the method and the display apparatus can skip frequencies with identifiers when performing channel search based on the second broadcast version by marking the frequencies for which the channel search for the first broadcast version has been completed, avoiding repeated searches of certain frequencies, reducing the time of the channel search for the second broadcast version, and improving the efficiency of the channel search.

When the display apparatus (for example, smart TV) is used for the first time or updates TV channels, there is a need to perform a channel search operation to realize the corresponding setting of TV channels (or called physical channels) and frequencies (each physical channel corresponds to a fixed frequency value). With the promotion of digital TVs, dtv (Digital TV) signals gradually replace atv (Analog TV) signals, that is, a certain frequency for transmitting atv signals is vacated for use by dtv signals. At present, the dtv signals and atv signals co-exist, so many countries adopt the signal transmission mode of mixed networking of analog TV and digital TV. At present, in order not to miss a dtv or atv channel when perform channel search on a smart TV, the channel search method of dtv+atv is generally used. When the channel search method of dtv+atv is used for channel search, each frequency in the frequency list needs to be searched twice, which greatly reduces the efficiency of channel search and thus affects the user experience.

The disclosure provides a display apparatus, including a user input interface and a processor, where the user input interface is configured to receive a channel search request from a user terminal. The processor is configured to: perform full-band search on a dtv signal, and record a physical channel number or frequency range where a searched frequency whose frequency is successfully locked is located; and skip the frequency whose frequency is successfully locked in a dtv channel search process, and search for an atv signal. Here, the full band refers to all bands supported in a certain market or region, for example, all bands in the physical channel data table of the TV antenna segment in the North American market in Table 1 below, and for another example, all bands in the physical channel data table of the TV cable segment in the North American market in Table 2 below.

Figure 8:
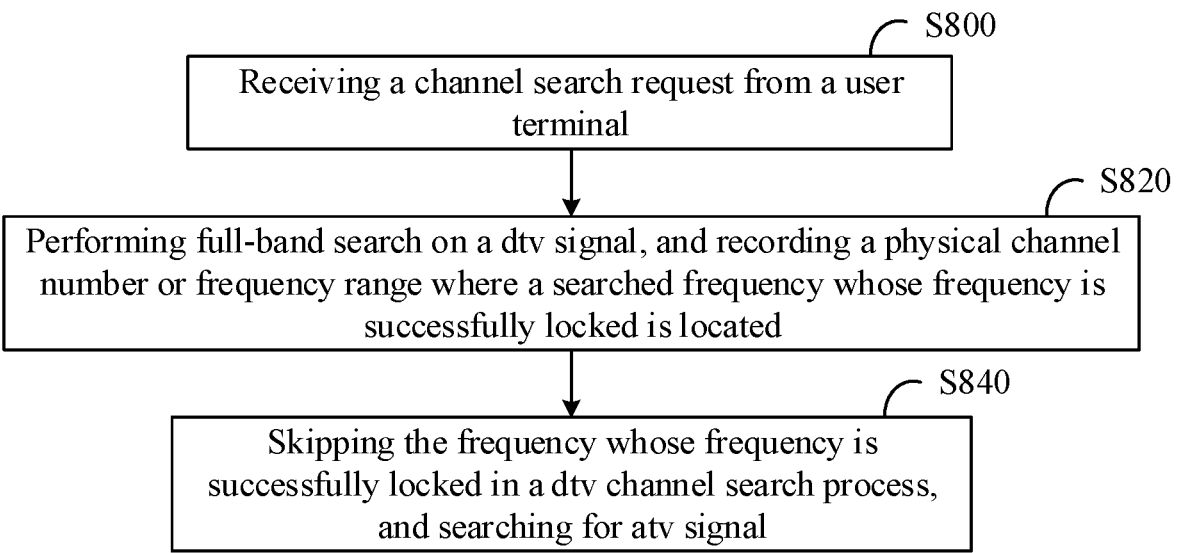
FIG. 8 shows a flowchart of another channel search method according to some embodiments.

For the display apparatus of the disclosure, the disclosure further provides a channel search method, as shown in FIG. 8, including the following steps.

S800: receiving a channel search request from a user terminal.

S820: performing full-band search on a dtv signal, and recording a physical channel number or frequency range where a searched frequency whose frequency is successfully locked is located.

S840: skipping the frequency whose frequency is successfully locked in a dtv channel search process, and searching for an atv signal.

A certain frequency can only carry one of dtv or atv signals within the bandwidth range, but not both. In the disclosure, this characteristic of the frequency described above is used. When the channel search method of dtv+atv is used for channel search, the dtv signal is firstly searched for. If the frequency is successfully locked at a certain frequency, then this frequency is skipped directly when searching for the atv signal. This method improves the efficiency of channel search and also improves the user experience.

Of course, in the specific use process, there are differences in the specific channel search processes due to different combinations. The specific implementation process of the channel search method of the disclosure will be described in detail below through examples.

Embodiment 1: the channel search process of an antenna interface signal of a display apparatus of a TV in the North American market is taken as an example. Table 1 is the physical channel data table of the TV antenna segment in the North American market.

TABLE 1

| physical channel data table of TV antenna segment in North American market | | |
| --- | --- | --- |
| | Antenna | |
| Channel Numbers | DTV freq(MHz) | ATV freq(MHz) |
| 2 | 57 | 55.25 |
| 3 | 63 | 61.25 |
| 4 | 69 | 67.25 |
| 5 | 79 | 77.25 |
| 6 | 85 | 83.25 |
| 7 | 177 | 175.25 |
| 8 | 183 | 181.25 |
| 9 | 189 | 187.25 |
| 10 | 195 | 193.25 |
| 11 | 201 | 199.25 |
| 12 | 207 | 205.25 |
| 13 | 213 | 211.25 |
| . . . | . . . | . . . |
| 69 | 803 | 801.25 |

It can be seen from the above table 1 that the North American market is quite special. The physical channel numbers of the antenna segment are from 2 to 69, the bandwidth is 6M, each physical channel corresponds to a fixed frequency value, and the dtv frequency value of each physical channel=the atv frequency value of the corresponding physical channel+1.75 Mhz.

Figure 9:
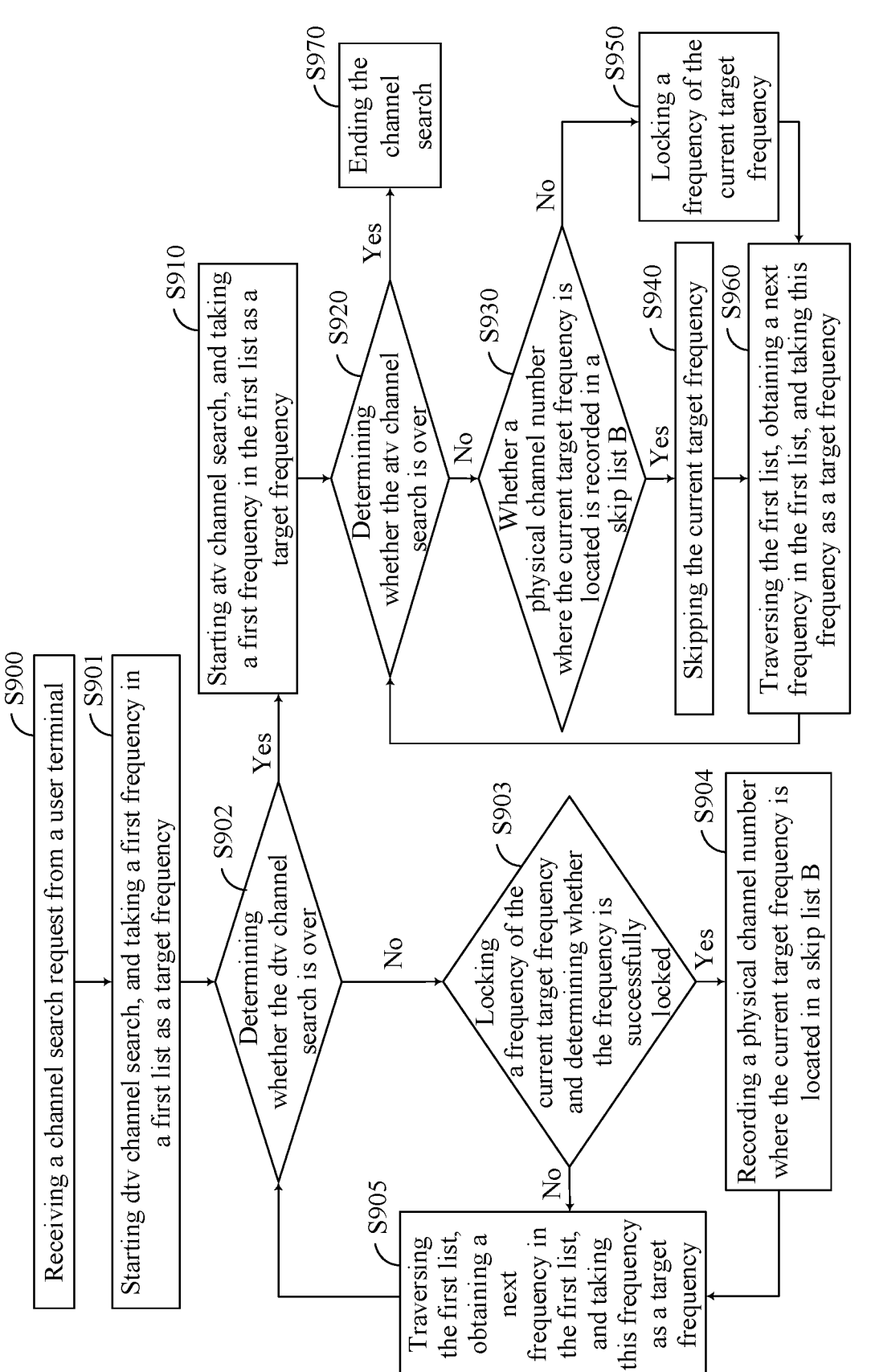
FIG. 9 shows a flowchart of a channel search process of an antenna interface signal of the display apparatus according to some embodiments.

As shown in FIG. 9, the channel search process of the antenna interface signal of the display apparatus of the TV in the North American market specifically includes the following steps.

S900: receiving a channel search request from a user terminal.

The full-band search is performed on a dtv signal, and a physical channel number where a searched frequency whose frequency is successfully locked is located is recorded. In this example, this step specifically includes the following steps.

S901: starting dtv channel search, and taking a first frequency in a first list as a target frequency.

S902: determining whether the dtv channel search is over.

S903: if the dtv channel search is not over, locking a frequency of the current target frequency and determining whether the frequency is successfully locked; if the frequency is successfully locked, proceeding to S904; if the frequency is not successfully locked, proceeding to S905.

S904: recording a physical channel number where the current target frequency is located in a skip list B.

S905: traversing the first list, obtaining a next frequency in the first list, taking this frequency as a target frequency, and returning to S902.

If the dtv channel search is over, the dtv channel search ends.

The frequency whose frequency is successfully locked in the dtv channel search process is skipped, and an atv signal is searched for. In this example, this step specifically includes the following steps.

S910: starting atv channel search, and taking a first frequency in the first list as a target frequency.

S920: determining whether the atv channel search is over.

S930: if the atv channel search is not over, determining whether a physical channel number where the current target frequency is located is recorded in a skip list B.

S940: if the physical channel number where the current target frequency is located is recorded in the skip list B, skipping the current target frequency.

S950: if the physical channel number where the current target frequency is located is not recorded in the skip list B, locking a frequency of the current target frequency.

S960: traversing the first list, obtaining a next frequency in the first list, taking this frequency as a target frequency, and returning to step S920.

S970: if the atv channel search is over, ending the channel search.

Embodiment 2: the channel search process of a cable interface signal of a display apparatus of a TV in the North American market is taken as an example. Table 2 is the physical channel data table of the TV cable segment in the North American market.

TABLE 2

| physical channel data table of TV cable segment in North American market | | | | |
| --- | --- | --- | --- | --- |
| | Cable | | | |
| | DTV freq(MHz) | | ATV freq(MHz) | |
| CH. NO | STD | HRC | STD | HRC |
| 1 | 75 | 73.75 | 73.25 | 73.25 |
| 2 | 57 | 55.75 | 55.25 | 55.25 |
| 3 | 63 | 61.75 | 61.25 | 61.25 |
| 4 | 69 | 67.75 | 67.25 | 67.25 |
| 5 | 79 | 79.75 | 77.25 | 79.25 |
| 6 | 85 | 85.75 | 83.25 | 85.25 |
| 7 | 177 | 175.75 | 175.25 | 175.25 |
| 8 | 183 | 181.75 | 181.25 | 181.25 |
| 9 | 189 | 187.75 | 187.25 | 187.25 |
| 10 | 195 | 193.75 | 193.25 | 193.25 |
| 11 | 201 | 199.75 | 199.25 | 199.25 |
| 12 | 207 | 205.75 | 205.25 | 205.25 |
| 13 | 213 | 211.75 | 211.25 | 211.25 |
| . . . | . . . | . . . | . . . | . . . |
| 135 | 861 | 859.75 | 859.25 | 859.25 |

As can be seen from the above Table 2, the physical channel numbers of the cable segment are from 1 to 135, the bandwidth is 6M, and each physical channel corresponds to a fixed frequency value, but slightly different from the antenna segment. For different regions (states), the Cable standards used are different, and the main frequency setting includes STD (Standard Cable TV signals) frequency setting and HRC (Harmonic Related Carrier). For each city, only one of standards is generally used, but multiple standards are not mixed for use. Therefore, in addition to the antenna segment, the optimization of the channel search in the cable segment can also include a standard check process. If the frequency is successfully locked at a certain frequency, the standard used is fixed, and this standard will be used for the channel search for subsequent frequencies.

Figure 10:
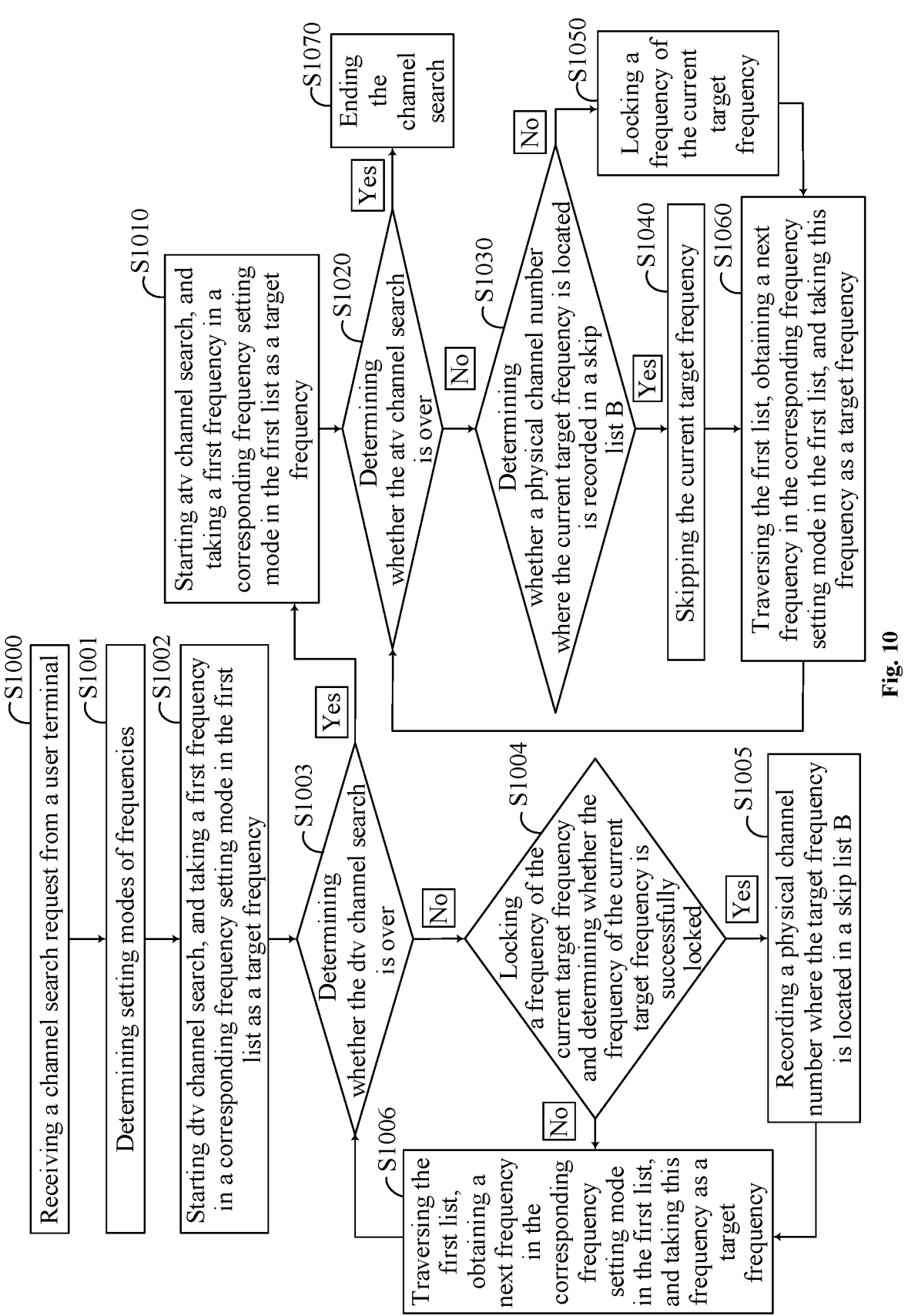
FIG. 10 shows a flowchart of a channel search process of a cable interface signal of the display apparatus according to some embodiments.

As shown in FIG. 10, the channel search process of the cable interface signal of the display apparatus of the TV in the North American market specifically includes the following steps.

S1000: receiving a channel search request from a user terminal.

The full-band search is performed on a dtv signal, and a physical channel number where a searched frequency whose frequency is successfully locked is located is recorded. In this example, this step specifically includes the following steps.

S1001: determining setting modes of frequencies, where setting modes of frequencies include STD and HRC; and determining whether the setting mode of the frequency is STD.

In this embodiment, the step of determining setting modes of frequencies, where setting modes of frequencies include STD and HRC, specifically includes:

taking an STD frequency corresponding to a first frequency in the frequency list as a predicted frequency; and locking a frequency of the predicted frequency; if the frequency is locked successfully, the frequency setting mode is STD, and ending a determining process of the frequency setting mode; if the frequency is not locked successfully, locking a frequency of an HRC frequency corresponding to the predicted frequency; if the frequency is locked successfully, the frequency setting mode is HRC, and ending the determining process of the frequency setting mode; if the frequency is not locked successfully, traversing an STD frequency corresponding to a next frequency in the frequency list as a predicted frequency, and repeating this step until the frequency is locked successfully.

S1002: starting dtv channel search, and taking a first frequency in a corresponding frequency setting mode in the first list as a target frequency.

S1003: determining whether the dtv channel search is over.

S1004: if the dtv channel search is not over, locking a frequency of the current target frequency and determining whether the frequency of the current target frequency is successfully locked; if the frequency is successfully locked, proceeding to S1005; if the frequency is not successfully locked, proceeding to S1006.

S1005: recording a physical channel number where the target frequency is located in a skip list B.

S1006: traversing the first list, obtaining a next frequency in the corresponding frequency setting mode in the first list, taking this frequency as a target frequency, and returning to step S1003.

If the dtv channel search is over, the dtv channel search ends.

The frequency whose frequency is successfully locked in the dtv channel search process is skipped, and an atv signal is searched for. In this example, this step specifically includes the following steps.

S1010: starting atv channel search, and taking a first frequency in a corresponding frequency setting mode in the first list as a target frequency.

S1020: determining whether the atv channel search is over.

S1030: if the atv channel search is not over, determining whether a physical channel number where the current target frequency is located is recorded in a skip list B.

S1040: if the physical channel number where the current target frequency is located is recorded in the skip list B, skipping the current target frequency.

S1050: if the physical channel number where the current target frequency is located is not recorded in the skip list B, locking a frequency of the current target frequency.

S1060: traversing the first list, obtaining a next frequency in the corresponding frequency setting mode in the first list, taking this frequency as a target frequency, and returning to step S1030.

S1070: if the atv channel search is over, ending the channel search.

Figure 11:
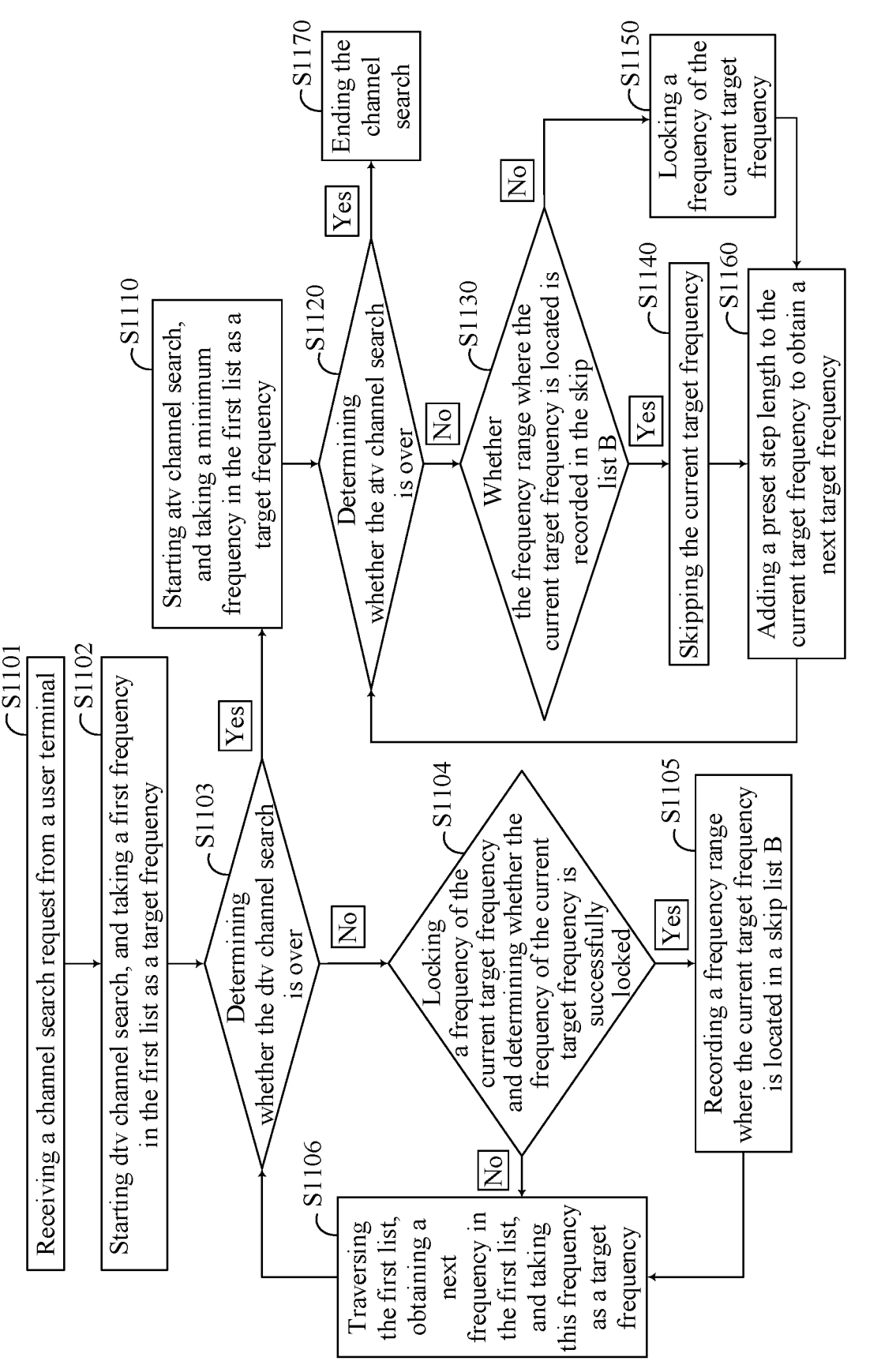
FIG. 11 shows a flowchart of a channel search process of the display apparatus according to some embodiments.

Embodiment 3: the channel search process of a TV in the EM market is taken as an example, where the EM market is an emerging market, mainly including Southeast Asia, Africa, Hong Kong, Macao and Taiwan markets. As shown in FIG. 11, the channel search process of the TV in the EM market specifically includes the following steps.

S1101: receiving a channel search request from a user terminal.

The full-band search is performed on a dtv signal, and a frequency range where a searched frequency whose frequency is successfully locked is located is recorded. In this example, this step specifically includes the following operations.

S1102: starting dtv channel search, and taking a first frequency in the first list as a target frequency.

S1103: determining whether the dtv channel search is over.

S1104: if the dtv channel search is not over, locking a frequency of the current target frequency and determining whether the frequency of the current target frequency is successfully locked; if the frequency is successfully locked, proceeding to S1105; if the frequency is not successfully locked, proceeding to S1106.

S1105: recording a frequency range where the current target frequency is located in a skip list B, for example, the target frequency is 474 Mhz, and the frequency range recorded at this time is [470 Mhz, 478 Mhz].

S1106: traversing the first list, obtaining a next frequency in the first list, taking this frequency as a target frequency, and returning to step S1103.

If the dtv channel search is over, the dtv channel search ends.

The frequency whose frequency is successfully locked in the dtv channel search process is skipped, and an atv signal is searched for. In this example, this step specifically includes the following steps.

S1110: starting atv channel search, and taking a minimum frequency in the first list as a target frequency.

S1120: determining whether the atv channel search is over.

S1130: if the atv channel search is not over, determining whether the frequency range where the current target frequency is located is recorded in the skip list B.

S1140: if the frequency range where the current target frequency is located is recorded in the skip list B, skipping the current target frequency.

S1150: if the frequency range where the current target frequency is located is not recorded in the skip list B, locking a frequency of the current target frequency.

S1160: adding a preset step length to the current target frequency to obtain a next target frequency, and returning to step S1120.

For an analog TV, the center frequency thereof is not as fixed as the center frequency of the TV in the North American market. Therefore, in this example, the channel search is gradually accumulated according to the step length; and of course, the frequency list of each country is slightly different, for example, the bandwidth is 6M, 7M or 8M. Therefore, the preset step length increased during operation can be adjusted accordingly according to the actual situation.

S1170: if the atv channel search is over, ending the channel search.

In order to measure the channel search efficiency of the channel search method of the disclosure, Table 3 gives the channel search durations of different TV models respectively for the antenna interface signal of the display apparatus and the cable interface signal of the display apparatus.

TABLE 3

| performance data of channel search for different TV models | | | |
|---|---|---|---|
| Model | Antenna Automatic Channel Search | Cable Automatic Channel Search | Sum |
| roko | 1 minute and 35 seconds/1 minute and 37 seconds | 8 minutes and 05 seconds/8 minutes and 05 seconds | 9 minutes and 40 seconds/9 minutes and 42 seconds |
| 6886us(SI2151) | 1 minute and 51 seconds/1 minute and 52 seconds | 4 minutes and 24 seconds/4 minutes and 25 seconds | 6 minutes and 15 seconds/6 minutes and 17 seconds |
| 6683us(MXL661) | 2 minutes and 15 seconds/2 minutes and 11 seconds | 5 minutes and 05 seconds/5 minutes and 08 seconds | About 7 minutes and 20 seconds |
| 9900us(SI2151) | 1 minute and 08 seconds | 2 minutes and 50 seconds | About 3 minutes and 58 seconds |

As can be seen from the data in Table 3, the channel search performance of model 9900 us has been greatly improved.

The disclosure discloses a display apparatus and a channel search method, where the characteristic that a certain frequency can only carry one of dtv or atv signals within the bandwidth range is used to perform full-band search on the dtv signal, and record the searched frequency whose frequency is successfully locked; and skip the frequency whose frequency is successfully locked in the dtv channel search process, and search for the atv signal. When the channel search method of the disclosure is used to search for TV channels, the use of the channel search mode of dtv+atv ensures the comprehensiveness of channel search on the one hand, and on the other hand, for the frequency whose frequency is successfully locked in the dtv channel search process, this frequency is skipped during the atv channel search, improving the channel search efficiency and user experience.

For the convenience of explanation, the above description has been made in conjunction with specific embodiments. However, the above exemplary discussions are not intended to be exhaustive or to limit implementations to the specific forms disclosed above. Numerous modifications and variations can be obtained in light of the above teachings. The above embodiments are chosen and described in order to better explain the principles and practical applications, so as to enable those skilled in the art to better utilize the described embodiments and various variant embodiments suitable for specific use considerations.

22

What is claimed is:
1. A display apparatus, comprising:
a display configured to present an image from a broadcast system;
a user input interface configured to receive an instruction; and
at least one processor configured to execute instructions to cause the display apparatus to:
in response to a channel search instruction, obtain a frequency of a channel to be searched in a first list of frequencies, perform channel search to obtain a first-type broadcast channel, and determine one or more frequencies corresponding to the first-type broadcast channel;
skip the one or more frequencies corresponding to the first-type broadcast channel, and perform channel search based on remaining frequencies in the first list of frequencies to obtain a second-type broadcast channel;
wherein the at least one processor is further configured to execute the instructions to cause the display apparatus to:
obtain a first broadcast version and a second broadcast version for providing channels, wherein the first broadcast version and the second broadcast version are different versions of a same broadcast protocol;
wherein the at least one processor is further configured to execute the instructions to cause the display apparatus to:
obtain a target frequency in the first list of frequencies in sequence, and determine whether the target frequency is valid;
in response to the target frequency being valid, perform channel search based on the target frequency and the first broadcast version to obtain the first-type broadcast channel; and
in response to the target frequency being invalid and completing channel search for all frequencies in the first list of frequencies, determine that channel search for the first broadcast version is completed.
2. The display apparatus according to claim 1, wherein the at least one processor is further configured to execute the instructions to cause the display apparatus to:
perform channel search based on a first frequency in the first list of frequencies and the first broadcast version to obtain the first-type broadcast channel, and add an identifier to the first frequency corresponding to the first-type broadcast channel.
3. The display apparatus according to claim 2, wherein the at least one processor is further configured to execute the instructions to cause the display apparatus to:

upon completing the channel search for the first broadcast version, delete the first frequency with the identifier in the first list of frequencies, and perform channel search based on a second frequency in a second list of frequencies without the first frequency with the identifier derived from the first list of frequencies and the second broadcast version to obtain the second-type broadcast channel.

4. The display apparatus according to claim 3, wherein the at least one processor is further configured to execute the instructions to cause the display apparatus to:

obtain a target frequency in the second list of frequencies in sequence, and determine whether a channel search process has been completed for the target frequency;

based on that the channel search process has not been completed for the target frequency, perform channel search based on the target frequency and the second broadcast version to obtain the second-type broadcast channel, and obtain a next target frequency; and based on that the channel search process has been completed for the target frequency and after channel search is completed for all frequencies in the second list of frequencies, determine that the channel search for the second broadcast version is completed.

5. The display apparatus according to claim 4, wherein the at least one processor is further configured to execute the instructions to cause the display apparatus to:

based on that the channel search for the second broadcast version is completed, clear the identifier of the first frequency in the first list of frequencies and restore the first list of frequencies to an initial state.

6. The display apparatus according to claim 1, wherein the same broadcast protocol is an advanced television systems committee (ATSC) protocol.

7. A channel search method for a display apparatus, comprising:

in response to a channel search instruction, obtaining a frequency of a channel to be searched in a first list of frequencies, performing channel search to obtain a first-type broadcast channel, and determining one or more frequencies corresponding to the first-type broadcast channel;

skipping the one or more frequencies corresponding to the first-type broadcast channel, and performing channel search based on remaining frequencies in the first list of frequencies to obtain a second-type broadcast channel;

obtaining a first broadcast version and a second broadcast version for providing channels, wherein the first broadcast version and the second broadcast version are different versions of a same broadcast protocol;

obtaining a target frequency in the first list of frequencies in sequence, and determining whether the target frequency is valid;

in response to the target frequency being valid, performing channel search based on the target frequency and the first broadcast version to obtain the first-type broadcast channel; and in response to the target frequency being invalid and completing channel search for all frequencies in the first list of frequencies, determining that channel search for the first broadcast version is completed.

8. The method according to claim 7, further comprising:

performing channel search based on a first frequency in the first list of frequencies and the first broadcast version to obtain the first-type broadcast channel, and adding an identifier to the first frequency corresponding to the first-type broadcast channel.

9. The method according to claim 8, further comprising:

upon completing the channel search for the first broadcast version, deleting the first frequency with the identifier in the first list of frequencies, and performing channel search based on a second frequency in a second list of frequencies without the first frequency with the identifier derived from the first list of frequencies and the second broadcast version to obtain the second-type broadcast channel.

10. The method according to claim 9, further comprising:

obtaining a target frequency in the second list of frequencies in sequence, and determining whether a channel search process has been completed for the target frequency;

based on that the channel search process has not been completed for the target frequency, performing channel search based on the target frequency and the second broadcast version to obtain the second-type broadcast channel, and obtain a next target frequency; and based on that the channel search process has been completed for the target frequency and after channel search is completed for all frequencies in the second list of frequencies, determining that the channel search for the second broadcast version is completed.

11. The method according to claim 10, further comprising:

based on that the channel search for the second broadcast version is completed, clearing the identifier of the first frequency in the first list of frequencies and restoring the first list of frequencies to an initial state.

12. The method according to claim 7, wherein the same broadcast protocol is an advanced television systems committee (ATSC).

* * * * *